US008256383B2

(12) United States Patent
Madsen

(10) Patent No.: US 8,256,383 B2
(45) Date of Patent: Sep. 4, 2012

(54) COLLAPSIBLE PRACTICE BARRELS FOR EQUINE BARREL RACING

(75) Inventor: Denise L. Madsen, Arroyo Grande, CA (US)

(73) Assignee: Seventeenflat.com, Arroyo Grande, CA (US)

( * ) Notice: Subject to any disclaimer, the term of this patent is extended or adjusted under 35 U.S.C. 154(b) by 0 days.

(21) Appl. No.: 12/977,632

(22) Filed: Dec. 23, 2010

(65) Prior Publication Data

US 2011/0088633 A1   Apr. 21, 2011

Related U.S. Application Data

(62) Division of application No. 11/018,686, filed on Dec. 21, 2004, now Pat. No. 7,870,838.

(60) Provisional application No. 60/532,812, filed on Dec. 29, 2003.

(51) Int. Cl.
*A01K 15/02* (2006.01)

(52) U.S. Cl. ....................................................... 119/705

(58) Field of Classification Search .................. 119/702, 119/705, 707, 712
See application file for complete search history.

(56) References Cited

U.S. PATENT DOCUMENTS

| 1,321,317 | A | * | 11/1919 | Knol | 220/8 |
| 1,804,190 | A | * | 5/1931 | Wendel | 2/89 |
| 1,990,804 | A | * | 2/1935 | Watson | 135/128 |
| 4,067,346 | A | * | 1/1978 | Husted | 135/153 |
| 4,224,754 | A | * | 9/1980 | Derryberry | 43/1 |
| 4,825,578 | A | * | 5/1989 | Robinson | 43/1 |
| 5,592,961 | A | * | 1/1997 | Chin | 135/125 |
| 6,273,777 | B1 | * | 8/2001 | Harris | 446/28 |

* cited by examiner

*Primary Examiner* — Son T Nguyen
(74) *Attorney, Agent, or Firm* — Morriss O'Bryant Compagni

(57) ABSTRACT

A collapsible barrel is provided for use in training for equine barrel racing. The collapsible barrel is configured and sized to approximate the dimensions of a conventional barrel used in the sport of equine barrel racing, but is constructed of sturdy, lightweight materials that enable the barrel to be transformed between a fully deployed state and a collapsed state. The collapsible barrel of the present invention is sufficiently lightweight and dimensioned, when in a collapsed state, to be easily transported, deployed for training and later stored. The flexibility of the collapsible barrel makes training ideal because it eliminates injury to the legs of the rider and the body of the horse.

5 Claims, 1 Drawing Sheet

COLLAPSIBLE PRACTICE BARRELS FOR EQUINE BARREL RACING

CROSS-REFERENCE TO RELATED APPLICATION

This is a non-provisional application which claims priority to provisional application Ser. No. 60/532,812 filed Dec. 29, 2003.

BACKGROUND OF THE INVENTION

1. Field of the Invention

This invention relates to equine sporting events where barrels are used in the performance of the sport, and specifically relates to a collapsible barrel-like structure useful in such equine events.

2. Description of Related Art

Equine barrel racing is one of many sporting events commonly found in the Western regions of America and Canada, and is strongly associated with rodeo events. Equine barrel racing generally involves a horse and rider running a prescribed pattern about three upright barrels. The pattern is usually that of a clover or other similar configuration.

The barrels that are typically used for equine barrel racing are 55 gallon drums made of sturdy metal material. The barrels are very heavy and difficult to move. Because the goal of barrel racing is to run the prescribed configuration in as little time as possible, adept riders will maneuver the horse as close to each barrel as possible to reduce the running time of the course. Consequently, there is a high tendency for the rider, and sometimes the horse, to come in contact with the heavy barrel resulting in the riders leg being injured by contact with the barrel.

Moreover, the fact that regulation racing barrels are heavy and unwieldy makes practicing very difficult for equine barrel racers because it is not possible for each racer to carry his or her own barrels around or transport them readily to a practice site. Thus, practice opportunities may be limited to an established practice site or the venue of the race.

It would be advantageous in the sport of equine barrel racing, therefore, to provide barrels that are easily transported, easily stored, economically feasible to own and which present less hazard to the legs of the rider or the body of the horse, all while still being very useful to the purpose of equine barrel racing.

BRIEF SUMMARY OF THE INVENTION

In accordance with the present invention, a collapsible barrel is structured for use as a training device for equine barrel racing. The collapsible barrel of the invention is substantially sturdy in construction for use in equine barrel racing, but is sufficiently lightweight for transport and storage. While the collapsible barrel of the present invention is described herein with respect to use for practicing equine barrel racing or training horses for the sport, the collapsible barrels may also be used in certain applications for actual racing.

The collapsible barrel of the present invention generally comprises a barrel-shaped body member that is structured to be readily transformed from a relatively flattened state to a three-dimensional deployed state for use in equine barrel racing training. The barrel-shaped body is comprised of a collapsible frame that is covered with a sleeve of selected material. When deployed to the three-dimensional state, the barrel-shaped body approximates the size of a standard barrel used for equine barrel racing. Currently, the standard barrel used for equine barrel racing is a 55 gallon metal drum, which generally has a diameter of twenty-three inches and a height of thirty-four to thirty-five inches. The size of the collapsible barrel of the present invention may, however, be made to any desirable or regulation size.

The frame of the collapsible barrel is structured to be transformable from a first collapsed state to a second deployed state, and then readily transformable back to a collapsed state. The frame is also selected to be lightweight so that the collapsible barrel may be readily transported and stored. Therefore, the frame may, by way of example, be formed from a lightweight metal, alloy or plastic material which has a memory such that, when deployed from a collapsed state, the frame will automatically resume a fully deployed state of a selected height and/or diameter.

A particularly suitable frame is formed from a memory metal, such as, for example, five millimeter iron wire coil. Other metal or plastic materials that are elastically deformable and which return to a selected shape or configuration are equally suitable for use. The frame, in one embodiment, is configured into a spiral form having a selected diameter and deployed height. The frame may then be collapsed in height to a selected dimension. Because the metal has a memory that enables the spiral to automatically deploy to a selected height, it is necessary to secure the frame when in the collapsed state. The collapsed frame may be secured by any suitable means, such as by straps or fasteners that encircle the collapsed ring of the frame.

The barrel-shaped body member is further comprised of a generally cylindrical sleeve connected in a suitable manner to the frame. The sleeve is made of any suitable material that enables transformation of the collapsible barrel from a first collapsed state to a second deployed state, and which provides a barrel-like configuration to the invention. The sleeve may be made of any natural or synthetic material, whether woven or non-woven.

The barrel-shaped body member further comprises a top and a bottom. The bottom may be generally formed by an enclosed end of the sleeve. In a preferred embodiment, the bottom is constructed to receive a weighted member in the bottom, enclosed end of the sleeve. The weighted member may be attached to the frame or may be separate from the frame. The weighted member may, by way of example, be a flattened disk made of wood, metal or another suitable material that imparts a ballasting weight to the bottom of the collapsible barrel, but which does not impart so much weight that the collapsed barrel is too heavy to lift, transport or store.

The top of the barrel-shaped body member may be open or, in a preferred embodiment, may be fully or partially closed, such as by a second end of the sleeve. In a preferred embodiment, the top end of the sleeve is provided with an opening that may be enlarged to allow objects to be placed within the interior of the collapsible barrel formed by the outer walls, top and bottom of the sleeve. For example, it may be desirable to place additional ballasting materials into the interior of the collapsible barrel to stabilize it during practice. When the frame of the collapsible barrel is lowered to the collapsed state, the added ballasting materials may simply be removed from the opening in the sleeve top.

The collapsible barrel of the present invention provides a stable, yet flexible barrel device that is very suitable for training horses and riders for negotiating the tight turns about the barrel which is characteristic of the barrel racing event. The flexibility of the collapsible barrel prevents injury to the rider's legs and/or the horse's body as is common in barrel racing with 55 gallon metal barrels. Further, it has been observed that horses trained using the collapsible barrel of the present invention react more favorably to the flexible nature of the barrel than a 55 gallon tank, thereby making training easier for the horse.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
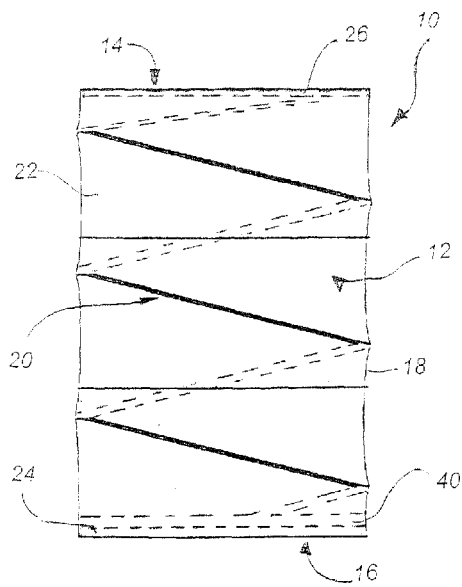
FIG. 1 is a view in elevation of a collapsible barrel of the present invention when the barrel is fully deployed.

FIG. 1 illustrates the collapsible barrel 10 of the present invention when in a fully deployed state. The collapsible barrel 10 generally comprises a barrel-shaped body member 12 having a top 14, a bottom 16 and a circumferential wall 18. The barrel-shaped body member 12 is further comprised of a collapsible frame 20 and a sleeve 22.

The collapsible frame 20 shown in FIG. 1, by way of example, is made of a material that has a "memory" in that the material can move elastically from a first collapsed state to a deployed state, and return back to a collapsed state automatically. The frame 20 of FIG. 1 is formed as a spiral shape, but may be formed in any other suitable configuration or form. The spiral is capable of being compressed, as shown in FIG. 2, into a collapsed stated and is capable of automatically springing back into an upstanding spiral configuration, as shown in FIG. 1, when released from the collapsed state.

The collapsible barrel 10 may further include a bottom ring 24 of material positioned at or near the bottom 16 of the barrel-shaped body member 12. The bottom ring 24 may be connected to the frame 20 or may be separate from the frame 20. The bottom ring 24 generally serves to stabilize the frame 20 in its deployed state, as shown in FIG. 1, and retains the collapsible barrel 10 in an upright and substantially vertical position.

The collapsible barrel 10 may further include a top ring 26 of material positioned at or near the top 14 of the barrel-shaped body member 12. Like the bottom ring 24, the top ring 26 may be separate from the frame 20, but is preferable connected to the frame 20 to help support the frame in a deployed state. The top ring 26 further provides stability to the top end 14 of the barrel-shaped body member 12 and aids in support of the sleeve 22 in a deployed state.

Figure 2:
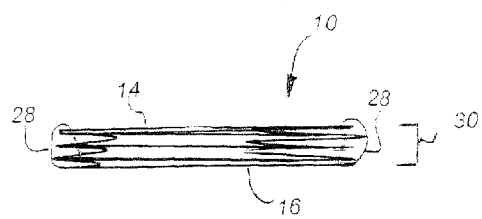
FIG. 2 is a view in elevation of the collapsible barrel shown in FIG. 1 where the barrel is in a collapsed state.

FIG. 2 shows the collapsible barrel 10 of the present invention in a collapsed state. The collapsed state may be achieved by, for example, pressing downwardly on the top ring 26 or upper frame 20 and forcing the top 14 of the frame 20 downwardly toward the bottom 16 of the frame 10. The sleeve 22 collapses with the frame 20 and preferably folds upon itself in an accordion-type fashion as shown. Because of the nature of the frame 20, that is, if the frame 20 is made of an elastically deformable "memory" material, it is necessary to anchor or retain the frame 20 in a collapsed state. Consequently, fastening members 28 are shown in FIG. 2 which engage and retain the frame 20 into a collapsed state. The fastening members 28 may be made of any suitable apparatus, but are shown here as strips having hook and loop fasteners to facilitate quick deployment of the frame 20.

Although illustrated as a flexible or elastically deformable material, the frame 20 may, alternatively, be constructed of a material, or in a manner, which is not elastically deformable in such a way as to have a "memory." Rather, the frame 20 may be structured in, for example, a lattice configuration that enables the collapse of the frame 20 a state as shown in FIG. 2, but which does not automatically and elastically spring into a deployed state as shown in FIG. 1. The frame 20 in such a structure would be deployed by lifting the top 14 of the collapsible barrel 10 upwardly to urge the frame 20 into a fully deployed state as shown in FIG. 1.

When in the collapsed state, as shown in FIG. 2, the collapsible barrel 10 may have a height 30 of between about one inch and about six inches, which renders the collapsible barrel 10 of a convenient size and shape for transport and storage. The collapsible barrel 10 may even be placed in a carrying case (not shown) for transport and storage.

Figure 3:
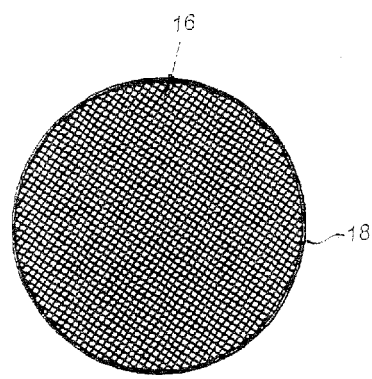
FIG. 3 is a plan view of the bottom of the collapsible barrel.

FIG. 3 depicts a view of the bottom 16 of the collapsible barrel 10 and generally illustrates that the bottom 16 may be configured with or formed from a material that is very durable. The bottom 16 may even be formed with a three-dimensional structure that imparts a tread-like surface to the bottom. The bottom 16 may, by way of example only, be made of a one millimeter or thicker polypropylene vinyl material that renders the bottom watertight and durable.

Figure 4:
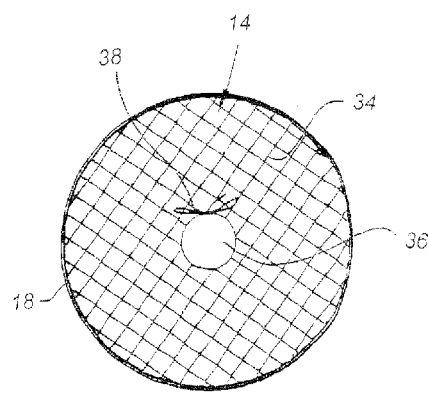
FIG. 4 is a plan view of the top of the collapsible barrel.

FIG. 4 depicts the top 14 of the collapsible barrel 10. Although the top 14, formed preferably by the sleeve 22, may be closed, the top 14 shown in FIG. 4 is partially open. That is, the top 14 is shown in FIG. 4 as being formed of a net-like material 34. The top 14 is also shown having a central opening 36 that is selectively widened by a drawstring 38. Alternatively, the opening 36 may be selectively widened by numerous other means, including an elastic band.

The opening 36 in the top 14 of the collapsible barrel 10 enables the placement of ballasting or weighting materials through the opening 36 and into the bottom 16 of the collapsible barrel 10. Such weighting materials stabilize the collapsible barrel 10 in an upright position. The collapsible barrel 10 may include a ballasting member 40 or members, as shown in FIG. 1, which are positioned at or near the bottom 16 of the collapsible barrel 10. The ballasting member 40 shown is, by way of example only, a circular disk of sufficiently heavy material to provide anchoring weight to the collapsible barrel 10. The ballasting member 40 may be made of, for example, wood, metal heavy plastic or composite materials, or any other material that provide weight to the collapsible barrel 10. An alternative means of inserting the ballasting material 40 into the collapsible barrel 10 is provide the top 14 with a closeable zipper.

The collapsible barrel of the present invention is structured and configured to provide an easily transportable, storable and deployable practice barrel that a horse rider may use in training for equine barrel racing. The collapsible barrel may be made of any number of different materials that impart lightweight portability and deployment, but which render the collapsible barrel sufficiently sturdy for training and for actual use in equine barrel racing. The collapsible barrel may be adapted for any number of different uses, and for uses with training or racing other animals. Thus, reference herein to details of the collapsible barrel are by way example only and not by way of limitation.

What is claimed is:

1. A method of carrying out equine barrel racing, comprising:

providing a collapsible barrel sized for use in performing equine barrel racing having a barrel-shaped body member, of requisite dimension for use in equine barrel racing, with a closeable top having a selectively widenable opening for passing a weighted ballasting member therethrough, an enclosed bottom and a circumferential wall having a vertically-extended height dimension of forty-eight inches or less, and having a frame structured for transformation of the barrel-shaped body member between a collapsed state and a fully deployed state and having a sleeve connected to the frame providing the circumferential wall of the barrel-shaped body member, and a weighted ballasting member positionable along the enclosed bottom;

deploying said collapsible barrel to a suitably-sized height for maneuvering a horse about said vertically deployed collapsible barrel by reconfiguring said collapsible barrel from a substantially vertically flattened state to a vertically upright apparatus that is suitably sized in height to maneuver a horse about said vertically deployed barrel state by operation of the vertically expandable frame;

positioning said vertically deployed collapsible barrel on a ground surface; and ridably maneuvering a horse about said vertically deployed collapsible barrel in the manner of equine barrel racing.

2. The method of claim 1 further comprising positioning a weighted ballasting member in said deployed collapsible barrel to stabilize said deployed collapsible barrel for use in equine barrel racing.

3. The method of claim 1 further comprising collapsing said vertically deployed collapsible barrel to a vertically reduced height for easy transportation and storage of said collapsed collapsible barrel between uses.

4. The method in accordance with claim 3 wherein the collapsing of said collapsible barrel comprises urging said collapsible barrel from a vertically upright state to a vertically flattened state by contracting said vertically expandable frame component from a vertically upright state to a vertically flattened state.

5. A method of carrying out equine barrel racing, comprising:

providing a collapsible barrel sized for use in performing equine barrel racing, the collapsible barrel further comprising,
  a collapsible frame made of elastically deformable material that can move automatically and elastically between a vertically flattened state and a vertically extended state,
  a sleeve positioned about the collapsible frame to provide a flexible circumferential wall,
  a top having a selectively widenable opening, and
  and enclosed bottom wall;

deploying said collapsible barrel to a suitably-sized height for maneuvering a horse about said vertically deployed collapsible barrel by reconfiguring said collapsible barrel from a substantially vertically flattened state to a vertically upright apparatus;

positioning the vertically deployed collapsible barrel on a ground surface; and ridably maneuvering a horse about the vertically deployed collapsible barrel in the manner of equine barrel racing.

* * * * *